(12) United States Patent
Baranowsky

(10) Patent No.: US 7,877,646 B2
(45) Date of Patent: Jan. 25, 2011

(54) METHOD AND SYSTEM FOR MONITORING A COMPUTING DEVICE

(75) Inventor: Michael J. Baranowsky, Markham (CA)

(73) Assignee: Oracle America, Inc., Redwood City, CA (US)

( * ) Notice: Subject to any disclaimer, the term of this patent is extended or adjusted under 35 U.S.C. 154(b) by 370 days.

(21) Appl. No.: 12/051,123

(22) Filed: Mar. 19, 2008

(65) Prior Publication Data

US 2009/0240985 A1 Sep. 24, 2009

(51) Int. Cl.
*G06F 11/00* (2006.01)
(52) U.S. Cl. .......................................... 714/47; 714/39
(58) Field of Classification Search .................. 714/47, 714/48, 2, 18, 25, 37, 39
See application file for complete search history.

(56) References Cited

U.S. PATENT DOCUMENTS

| | | | | |
|---|---|---|---|---|
| 6,134,668 A * | 10/2000 | Sheikh et al. | ............... | 713/310 |
| 6,202,160 B1 * | 3/2001 | Sheikh et al. | ............... | 713/310 |
| 6,965,928 B1 * | 11/2005 | Cox et al. | ................... | 709/220 |
| 7,065,566 B2 * | 6/2006 | Menard et al. | .............. | 709/223 |
| 2001/0020251 A1 * | 9/2001 | Sheikh et al. | ............... | 709/224 |

OTHER PUBLICATIONS

Noordergraaf, A. et al.; "Securing the Sun Fire Midframe System Controller"; Sun BluePrints OnLine—Sep. 2001, http://www.sun.com/blueprints; pp. 1-46 (46 pages).
"PVTerm—Pocket Virtual Terminal for Palm OS"; 2006-2008 Palm Software; http://www.palmsoftware.us/v, c3ltYmlhbjE4MTYz/pvterm_pocket_virtual_terminal.jsp; (1 page).
"Customer Support Knowledge Library"; Palm m125 Specifications; Apr. 24, 2007; http://kb.palm.com/SRVS/CGI-BIN/WEBCGI.EXE?New,Kb=PalmSupportKB, CASE=12646 (2 pages).

* cited by examiner

*Primary Examiner*—Dieu-Minh Le
(74) *Attorney, Agent, or Firm*—Osha • Liang LLP

(57) ABSTRACT

In general, in one aspect, the invention relates to a method for monitoring a computing device, that includes receiving, by a data collector, a plurality of system messages from a system controller, wherein the data collector is wired to a serial port component of the system controller, wherein the system controller is factory preconfigured to automatically send the plurality of system messages via the serial port when the data collector is connected to the serial port, wherein the computing device comprises the system controller, and wherein the data collector is independent of the computing device. The method further includes storing data from the plurality of system messages on the data collector, receiving, by the data collector, a data transmit request, and wirelessly transmitting, by the data collector, the data to a field receiver.

16 Claims, 4 Drawing Sheets

METHOD AND SYSTEM FOR MONITORING A COMPUTING DEVICE

BACKGROUND

A computing device is a hardware device that is able to process instructions. For example, a computing device may be a personal computer, a server, a server farm, workstation, or any other such device. Occasionally, computing devices fail. In particular, one or more components of the computing device may cease to function properly. For example, the component may stop functioning as a result of overheating or the software or hardware within the computing device may fail.

One type of computing device that may fail is a server. Failure of a server is particularly disruptive because of the productivity loss and potential data loss caused by the failed server. Because servers can fail, servers often include a system controller to manage the server.

The system controller is a component of the server that can control components of the server. Additionally, the system controller provides an administrator with system messages about the state of the components of the server. When a fault occurs, the system messages may be used to recover from the fault. In particular, the system messages may be used to identify the conditions of the components of the server that resulted in fault. Because the system controller is a part of the server, when the server suffers a power fault, the system controller is often affected. Thus, the system messages are typically offloaded from the system controller onto a console logger or a network connected loghost.

While the system controller is providing the system messages, a console logger, which is simply a monitor, displays the system messages. If the user viewed the system messages before the system messages scrolled off-screen, the user may prevent the server from failing or recover the server after the server failed.

Another method for capturing system messages is to store the system messages on a network connected loghost. A network connected loghost is a server or workstation on the customer's network that stores the system messages. After the server is installed in the physical site (i.e., at a consumer's site), the network address of the network connected loghost is identified. Using the network address, the system controller in the server is configured to send messages to the network connected loghost. When fault occurs, a network administrator with root access to the network connected loghost is contacted. The network administrator provides credentials to the network connected loghost to retrieve the system messages and recover the server.

SUMMARY

In general, in one aspect, the invention relates to a method for monitoring a computing device, that includes receiving, by a data collector, a plurality of system messages from a system controller, wherein the data collector is wired to a serial port component of the system controller, wherein the system controller is factory preconfigured to automatically send the plurality of system messages via the serial port when the data collector is connected to the serial port, wherein the computing device comprises the system controller, and wherein the data collector is independent of the computing device. The method further includes storing data from the plurality of system messages on the data collector, receiving, by the data collector, a data transmit request, and wirelessly transmitting, by the data collector, the data to a field receiver.

In general, in one aspect, the invention relates to an apparatus for monitoring a computing device, that includes a storage module for storing data from a plurality of system messages, and a processing module for receiving the plurality of system messages from a system controller, wherein the computing device comprises the system controller, storing data from the plurality of system messages in the storage module. The apparatus may further include a transmitting unit for wirelessly transmitting the plurality of system messages to a receiving device, wherein the apparatus is wired to a serial port component of the system controller, and wherein the system controller is factory preconfigured to automatically send the plurality of system messages via the serial port when the data collector is connected to the serial port. In one or more embodiments of the invention, the apparatus is independent of the computing device.

In general, in one aspect, the invention relates to a method for diagnosing a fault of a computing device that includes selecting a synchronization button, and receiving, by a field device, data from a data collector based on the selection, wherein the data is received wirelessly, wherein the data collector is wired to a serial port component of the system controller, wherein the system controller is factory preconfigured to automatically send the plurality of system messages via the serial port when the data collector is connected to the serial port, wherein the computing device comprises the system controller, wherein the data collector is independent of the computing device, and wherein the data collector passively receives system messages from the computing device and stores data from the system messages. The method further includes analyzing the data to identify the fault in the computing device.

Other aspects of the invention will be apparent from the following description and the appended claims.

DETAILED DESCRIPTION

Figure 1:
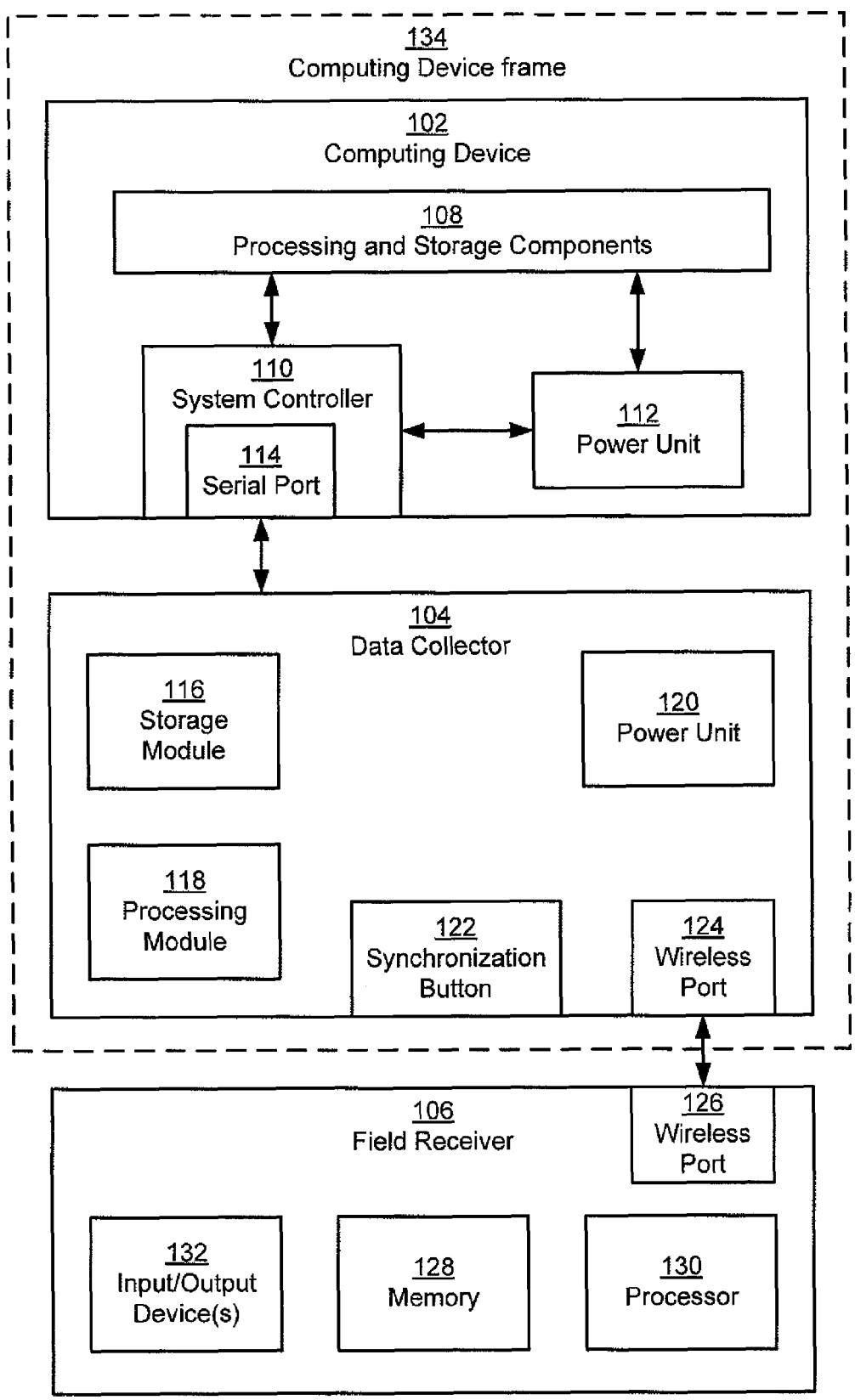
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus for monitoring a computing device. Specifically, embodiments of the invention directly connect a data collector, which stores data, to a serial port of a system controller. The system controller is factory preconfigured to send system messages to the serial port when a device, such as the data collector, is connected. While the system controller is sending system messages, the data collector receives the system messages and stores data. Further, in one or more embodiments of the invention, the data collector is independent of the computing device. Because of the independence of the data collector, when the computing device fails, data from the system messages is available. Thus, the data is available to be analyzed to identify the cause of the fault.

FIG. 1 shows a schematic diagram of a system in accordance with one or more embodiments of the invention. As shown in FIG. 1, the system includes a computing device (102), a data collector (104), and a field receiver (106) in accordance with one or more embodiments of the invention. Each of these components is described below.

A computing device (102) is any device that includes functionality to process instructions. For example, the computing device (102) may be a server, a server farm, a personal computer, or any other device for processing instructions. Examples of servers include an application server, a web server, a data storage server, a mail server, a game server, a news server, and a proxy server. The server may be high end, midrange, or low-end as compared to other servers on the market. Examples of personal computers include a laptop computer, a workstation computer, a desktop computer, or any other such type of personal computing device.

In one or more embodiments of the invention, the computing device (102) includes processing and storage components (108), a power unit (110), and a system controller (112). Those skilled in the art will appreciate that the computing device may include additional components not shown in FIG. 1, such as an Input/Output subsystem and other such components. Each component of the computing device is discussed below.

In one or more embodiments of the invention, the processing and storage components (108) are the components of the computing device (102) that perform the intended functionality of the computing device. For example, if the computing device (102) is a mail server, then the processing and storage components (108) perform the storage and retrieval of electronic mail messages as well as any other mail server functions. The processing and storage components (108) may include one or more processors, memory components (e.g., random access memory, cache memory, flash memory, hard disks, optical drives, flash memory sticks, etc.), network devices (e.g., network interface card(s)), software, and other components integral to performing the functionality of the computing device.

In one or more embodiments of the invention, the computing device's power unit (110) provides power to the computing device processing and storage components (108) and the system controller (112) (discussed below). Specifically, the computing devices power unit (110) may include the main power supply (not shown) within the computing device frame (134) (discussed below) and a backup battery (not shown) for the computing device (102).

In one or more embodiments of the invention, the system controller (112) is a hardware device that is physically linked to the hardware subsystem of the computing device (102). In one or more embodiments of the invention, the system controller (112) includes functionality to monitor and control hardware and/or software on the computing device (102). The hardware monitored and controlled on the computing device may include the processing and storage components (108) and the computing device's power unit (110). The software may include the operating system of the computing device and/or any management program for the computing device.

The system controller (112) may include a system controller board (not shown) and the system controller software (not shown). In one or more embodiments of the invention, the system controller software manages platform and domain resources, monitors and controls the platform and domains, configures domains and the platform, provides access to domain consoles, provides the date and time to the operating environment, provides the reference clock signal used throughout the system, provides console security, performs domain initialization, and provides a mechanism for updating the firmware on the boards installed in the system. Examples of system controllers may include an Integrated Lights Out Manager, an Advanced Lights Out Manager, a service processor, as well as other similar devices.

The monitoring may include receiving status messages from the hardware and the software. For example, when the computing device is first started (i.e., power is provided to each component of the computing device), the status messages may indicate that each component started and is functional. The status messages may also provide an indication of the network traffic, the number of processes executing on the computing device, the amount of memory used, any configuration changes that are performed, the status of different domains in the computing device (i.e., when the computing device has multiple domains), and other such status information.

In addition to monitoring the processing and storage components (108), the system controller (112) includes functionality to send system messages via a serial port (114) to a data collector (104). In one or more embodiments of the invention, the system messages include the status messages discussed above. The system messages may also include messages about components of the computing device that are not functioning properly.

In one or more embodiments of the invention, the system controller (112) is factory preconfigured to automatically send the system messages when a device, such as the data collector, is connected to the serial port (114). The system controller (112) is factory preconfigured when the configuration of the system controller occurs prior to the time at which the computing device (102) (in which the system controller (112) is located) is first positioned at the customer's site. The customer's site is the location designated by a customer who uses the computing device for processing. For a mobile computing device, the system controller (112) is factory preconfigured when the configuration occurs prior to a customer taking possession of the computing device (102) with the system controller (112) in accordance with one or more embodiments of the invention. For example, the configuration may be performed when the system controller (112) is built at a factory, when the system controller (112) is added to the computing device (102), when the computing device (102) is assembled, or any time prior to the computing device (102) being shipped to the customer.

In one or more embodiments of the invention, the system controller (112) includes a serial port (114). In one or more embodiments of the invention, a serial port (114) is a single physical input and output device connected to the serial port (114). A single wire or cable may be directly connected from the data collector (104) to the serial port (114) in accordance with one or more embodiments of the invention. Alternatively, as those skilled in the art will appreciate, a chain of wires or cables and/or one or more adaptors may connect the data collector (104) to the serial port (114).

In one or more embodiments of the invention, a data collector (104) is a hardware device that includes functionality to receive and store data based on the system messages from the system controller (112). In one or more embodiments of the invention, the data collector (104) is a personal digital assistant. For example, the data collector (104) may be a PALM® M125 personal digital assistance with pocket virtual terminal software, such as vt100 console software. (PALM® is a registered trademark of Palm, Inc., located in Sunnyvale, Calif.). In one or more embodiments of the invention, the data collector may be purchased as a personal digital assistant at a retail store. In one or more embodiments of the invention, the data collector (104) includes a storage module (116), a processing module (118), a power unit (120), a synchronization button (122), and a wireless port (124). Each component of the data collector (104) is discussed below.

The storage module (116) is a memory component of the data collector (104). In one or more embodiments of the invention, the storage module (116) includes non-volatile memory for storing the data from the system messages. The data that is stored may be the actual system messages, filtered system messages, or aggregated system messages. Filtered system messages are system messages that remaining after a filter is applied. For example, the filter may act to remove system messages that merely indicate each component is functioning properly. Aggregated system messages are single message that include information from a number of individual messages. For example, if a group of system messages report the same event at different times, then the corresponding aggregated system message may store only the different times and an single identifier of the event.

Further, the data may or may not be encrypted. The storage module (116) may include memory that is internal to the data collector (104) and/or memory that is external to the data collector (104). For example, the storage module (116) may be an external card in accordance with one or more embodiments of the invention.

In one or more embodiments of the invention, the data collector (104) may have a data retention policy for storing data in the storage module (116). The data retention policy may specify how long messages are stored, the types of messages or data to delete after a certain duration, and the operations to perform when the storage module does not have memory available. In one or more embodiments of the invention, the data is stored in accordance with the data retention policy.

The processing module (118) includes functionality to perform the processing of instructions on the data collector (104). For example, the processing module may be a processor that executes instructions for receiving the system messages, storing the data, and transmitting the data to a field receiver (106) (discussed below).

In one or more embodiments of the invention, the data collector (104) includes a power unit (120). The data collector's power unit (120) is separate from any power unit (e.g., power unit (110)) of the computing device. Thus, if the power supply of the computing device fails, the data collector may still function. One skilled in the art will appreciate that the data collector may share a power supply with the computing device which is separate from the data collector's power unit (120). For example, the data collector's power unit (120) may be a battery backup of the shared power supply.

In one or more embodiments of the invention, the synchronization button (122) is an externally exposed physical button on the data collector (104). For example, the synchronization button (122) may be a compressible button, a touchpad button, or any other such button. In one or more embodiments of the invention, the synchronization button (122) is dedicated to the function of initiating a transfer of data from the data collector (104) to the field receiver (106). Specifically, in one or more embodiments of the invention, the only task of the synchronization button (122) is for a user to request, by pressing the synchronization button (122), the transference of data.

In one or more embodiments of the invention, the data collector (104) includes only a single button (i.e., the synchronization button (122)).

In one or more embodiments of the invention, the data collector's wireless port (124) includes functionality to wirelessly (i.e., without wires or cables) transmit data from the data collector (104) to the field receiver (106). In one or more embodiments of the invention, the data collector's wireless port (124) is an infrared port.

The field receiver (106) is a mobile device that includes functionality to receive data from the data collector (104) for processing. For example, the field receiver (106) may be a laptop, smart phone, personal digital assistant, a specialized handheld device, etc. For example, the data collector (104) may be a PALM® M125 personal digital assistance, a Palm® Treo 650, an infrared port equipped laptop, or like device capable of receiving text or encrypted data. For example, the field receiver may include pocket virtual terminal software, such as vt100 console software. In one or more embodiments of the invention, the field receiver includes a wireless port (126), memory (128), a processor (130), and input and output device(s) (132).

The field receiver's wireless port (126) includes functionality to receive the data from the data collector's wireless port (124). The field receiver's wireless port (126) is compatible with the data collector's wireless port (124). For example, if the data collector's wireless port (124) is an infrared port, then the field receiver's wireless port (126) is also an infrared port in accordance with one or more embodiments of the invention.

In one or more embodiments of the invention, the field receiver's memory (128) includes functionality to store the data received by the field receiver's wireless port (126). Further, the field receiver's memory (128) may include volatile and/or non-volatile memory.

In one or more embodiments of the invention, the field receiver's processor (130) includes functionality to process instructions for the field receiver (106). The instructions may be part of software for receiving a transmission request from the data collector (104), receiving the data, storing the data, performing any desired data decryption, and/or analyzing the data to determine a cause of a fault in the computing device (102). Some or all of the aforementioned functionality may be performed by a separate device (not shown). For example, the field receiver (106) may include functionality to forward the data to the separate device for processing.

In one or more embodiments of the invention, the field receiver (106) is used by a service technician (not shown). In one or more embodiments of the invention, the service technician is not an employee of nor a volunteer for the customer. For example, the service technician may be an employee or a contract worker with the manufacturer or assembler of the computing device. In another example, the service technician may be employed by or a contract worker with a third party repair organization. Alternatively, the field receiver (106) may be used by an administrator of the computing device.

Regardless of who uses the field receiver (106), in one or more embodiments of the invention, the field receiver (106) allows for user interaction through one or more input/output devices (132). The input/output devices (132) may include a keyboard, keypad, monitor (e.g., liquid crystal display, cathode ray tube, plasma display, etc.), mouse, trackball, touch screen, microphone, speaker, or any other type of device for receiving and presenting data to a user.

Continuing with FIG. 1, the data collector (104) and the computing device (102) may both exist in the computing device frame (134) in accordance with one or more embodiments of the invention. Specifically, the data collector (104) and the computing device (102) may be packaged together so as to appear as if the data collector is a part of the computing device. For example, the computing device frame (134) may be a server rack, a tower having the computing device (102), the case of the computing device (102), etc. When the data collector (104) is in the computing device frame (134), the synchronization button (122) and the wireless port (124) on the data collector (104) may be exposed.

In one or more embodiments of the invention, the data collector (104) may be retrofitted to an existing computing device (102). In such scenario, the data collector (104) may or may not be physically attached to the computing device frame (134) and may or may not be physically located within the computing device frame (134).

Figure 2:
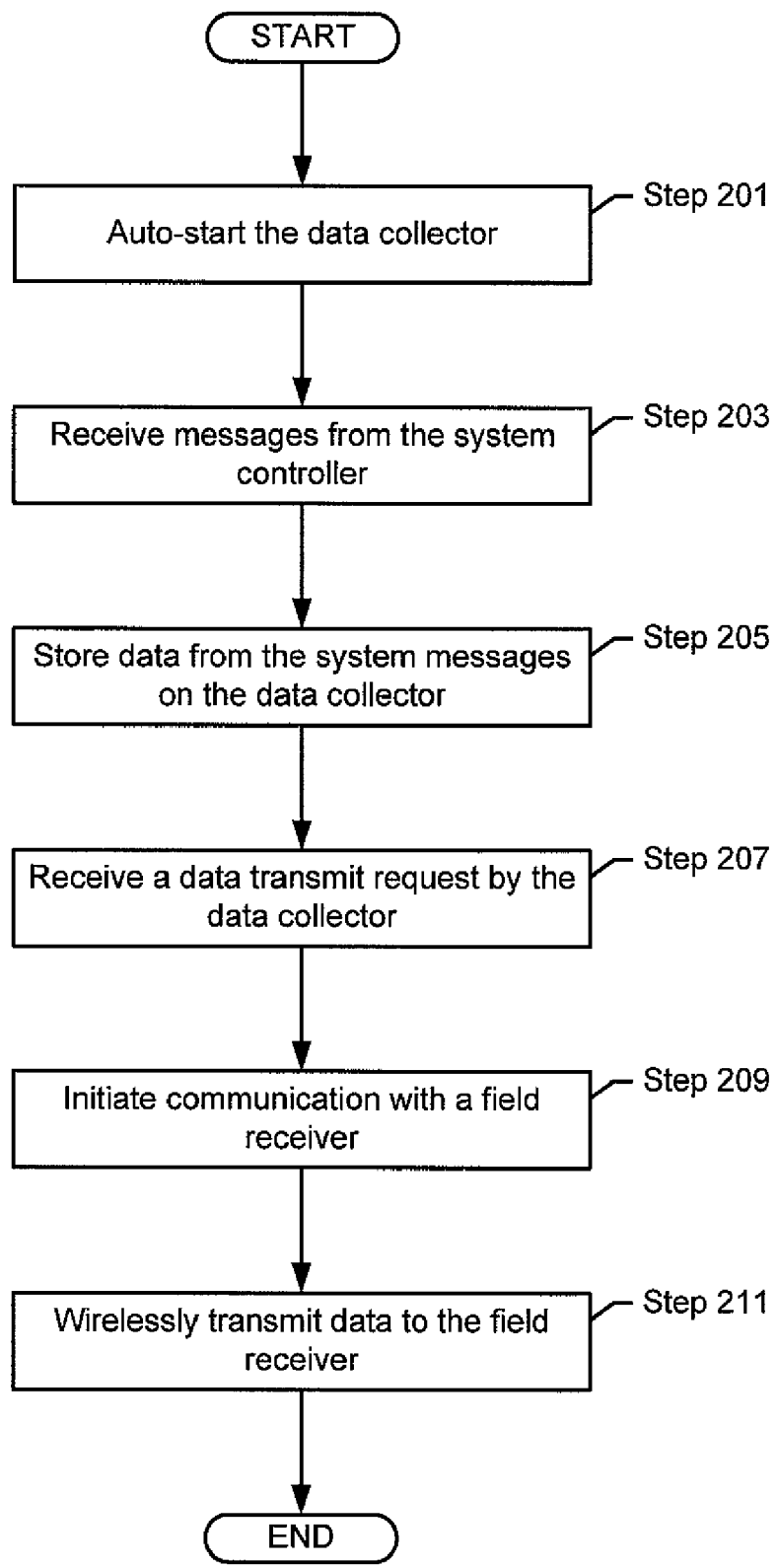
FIGS. 2-3 show flowcharts in accordance with one or more embodiments of the invention.
Figure 3:
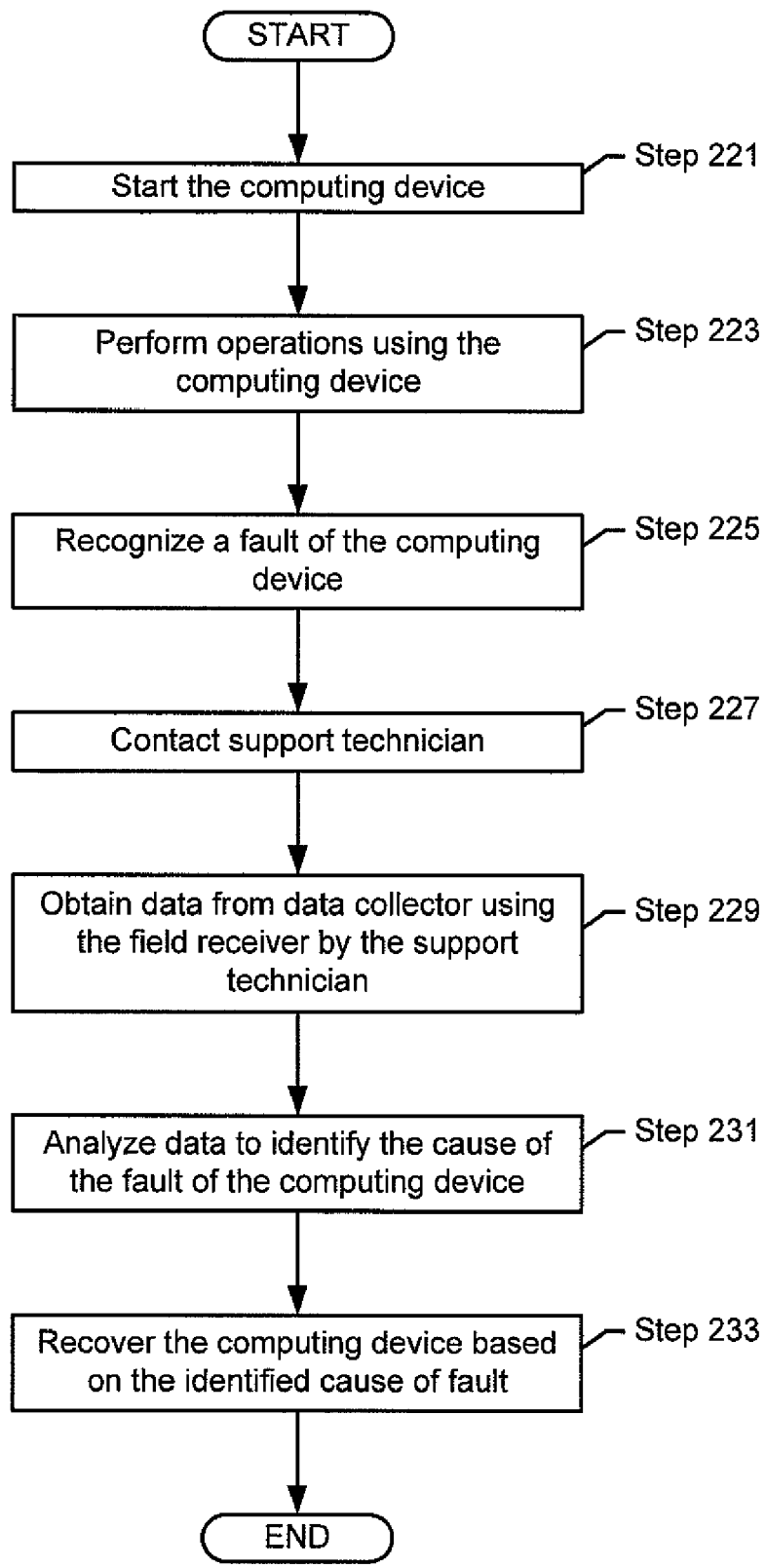

FIGS. 2-3 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. In addition, steps such as receive and store acknowledgements have been omitted to simplify the presentation.

FIG. 2 shows a flowchart of a method for the data collector to operate in accordance with one or more embodiments of the invention. Initially, the data collector auto-starts (Step 201). Specifically, when the computing device starts, the data collector also starts processing. In one or more embodiments of the invention, the starting of the data collector is automatic (i.e., without user intervention). By having an auto-start feature, if the computing device fails, data is still available regardless of whether the possibility of a fault is contemplated by the customer or administrator prior to the occurrence of the fault.

Continuing with FIG. 2, the data collector begins receiving messages from the system controller on the computing device (Step 203). After starting, the data collector is continuously powered on and receiving system messages in accordance with one or more embodiments of the invention. In one or more embodiments of the invention, because the system controller is factory preconfigured to send system messages via the serial port when a device is connected to the serial port, further configuration of the system controller is not required for the data collector to receive the system messages from the serial port. One skilled in the art will appreciate, however, that further configuration of the system controller may be performed if desired. For example, a user may further configure the system controller to limit the types of system messages sent to the data collector.

While the data collector is receiving messages, the data collector stores data from the system messages (Step 205). As discussed above, the data that the data collector stores may be the system messages, aggregated data from the system messages, filtered data from the system messages, etc. Further, the data collector may encrypt the data prior to storing the data. Encrypting the data may be performed using any encryption algorithm.

Continuing with FIG. 2, in one or more embodiments of the invention, the data collector receives a transmit request (Step 207). In one or more embodiments of the invention, the transmit request is received by way of the synchronization button. Specifically, the data collector may detect the selection of the synchronization button.

In response to the transmit request, the data collector initiates communication with a field receiver (Step 209). Initiating communication may include detecting the field receiver by sending a wireless signal and waiting for a response. When the response is received, the data collector may determine whether the field receiver is authorized to access the data. Determining whether the field receiver is authorized may be performed using any applicable technique known in the art for authentication and authorization.

Once communication is initiated, the data collector wirelessly transmits data to the field receiver (Step 211). Specifically, a copy of the data on the data collector is transmitted to the field receiver. Further, the data collector may retain or delete the data once the data is transmitted. The data collector may retain or delete the data based on manual intervention (e.g., by a support technician), an internal algorithm on the data collector, or a storage policy.

FIG. 3 shows a flowchart of a method for a user to diagnose a fault in accordance with one or more embodiments of the invention. While some of the steps below are described as a support technician performing the steps, one skilled in the art will appreciate that any individual may perform the actions of the support technician. Initially, the computing device is started (Step 221). Specifically, power is provided to the computing device. At this stage, the user may perform operations with the computing device (Step 223). For example, if the computing device is a web server, the web server processes web requests for the user.

In one or more embodiments of the invention, a fault of the computing device is recognized (Step 225). The computing device fault may occur at virtually any time while using the computing device. For example, the fault may occur while the computing device is started or restarted, while processing instructions, after the computing device is reconfigured, or at virtually any time during the lifetime of the computing device. Further, the fault may include a shut down of one or more components of the system, a severe slowdown of one or more components, a fault to respond to commands from a user, etc.

Accordingly, the support technician is contacted (Step 227). The support technician may be an onsite or offsite support technician. The support technician obtains data from the data collector (Step 229). Specifically, the support technician positions the field receiver in a location required to receive the data. For example, if the wireless ports are infrared ports, then the support technician may position the field receiver such that the port of the field receiver faces the port of the data collector. Further, the support technician selects the synchronization button on the data collector to initiate a transmit request in accordance with one or more embodiments of the invention. As discussed above, in response to the selection of the synchronization button, the data collector sends data to the field receiver.

Once the data is obtained by the field receiver, the data may be analyzed to determine the cause of the fault of the computing device (Step 231). For example, the analysis may be performed by the support technician using the field receiver. In another example, the support technician may send the data to the manufacturer of the computing device for analysis. The analysis that is performed may include determining when the start of the fault occurred, identifying the state of the computing device at the start of the fault, and contemplating the cause of the fault. Various techniques known in the art may be used to identify the cause of a fault.

Based on the identified cause of fault of the computing device, the computing device is recovered (Step 233). Specifically, faulty components may be fixed or replaced, the configuration of the computing device may be modified, and the computing device begins processing operations for the user. Alternatively, if recovery of the computing device is not possible, then the information learned from the analysis is used to prevent future fault of other computing devices.

Figure 4:
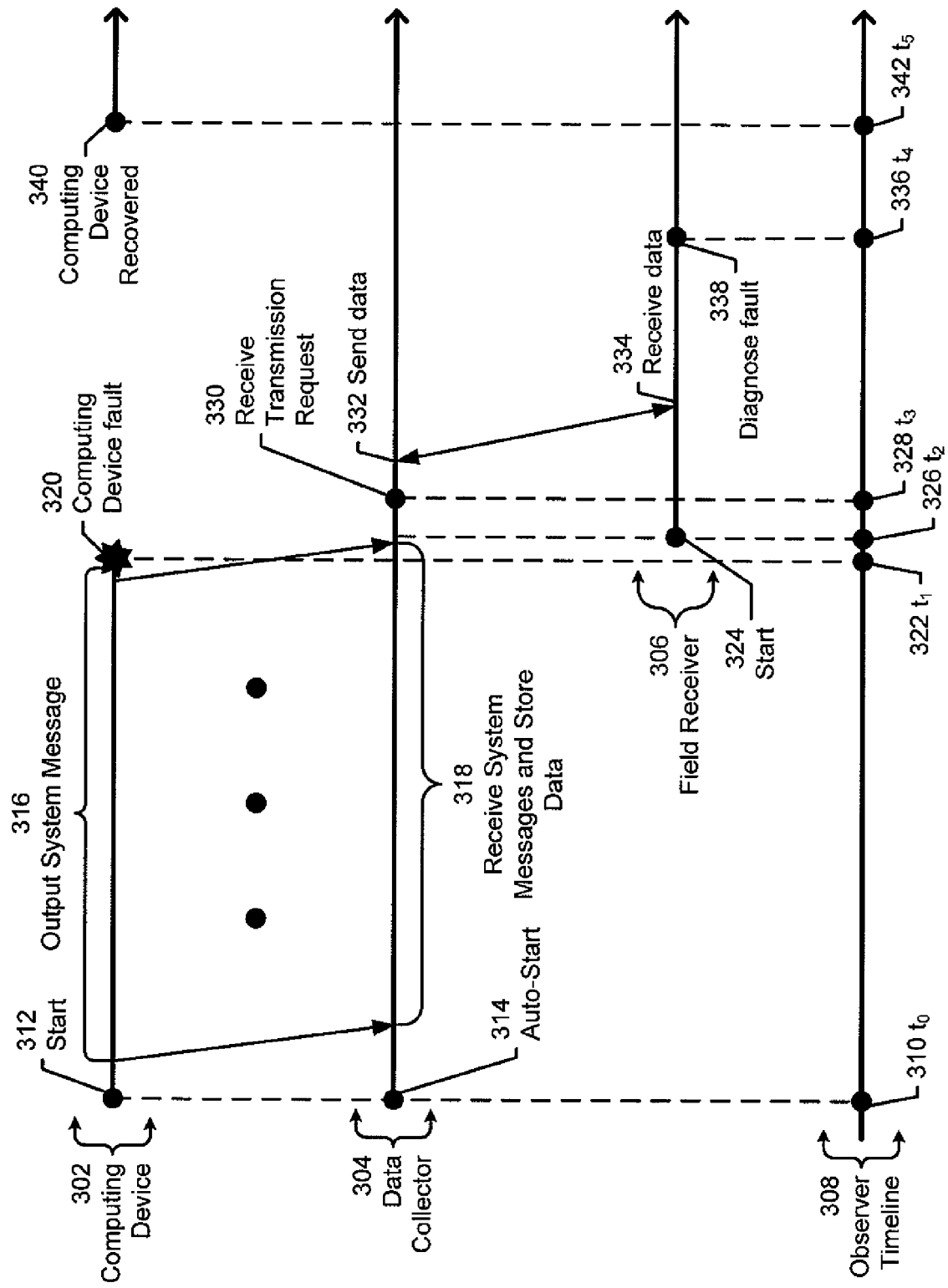
FIG. 4 shows an example in accordance with one or more embodiments of the invention.

FIG. 4 shows an example in accordance with one or more embodiments of the invention. The following is for exemplary purposes only and not intended to limit the scope of the invention. FIG. 4 shows example timelines for the computing device (302), the data collector (304), and the field receiver (306). The computing device timeline (302) shows the operations of the computing device at particular points in time. The data collector timeline (304) shows the operations of the data collector at particular points in time. The field receiver timeline (306) shows the operations of the field receiver at particular points in time. For explanatory purposes, the computing device (302), the data collector (304), and the field receiver (306) are compared against the same observer timeline (308). The observer timeline (308) shows the time according to an outside observer that simultaneously observes the computing device, the data collector, and the field receiver.

At time $t_0$ (310), the computing device starts (312) and the data collector auto-starts (314) in accordance with one or more embodiments of the invention. After starting, the system controller on the computing device, without being configured by the customer, outputs system messages (316) to the data collector while processing. While the computing device is outputting the system messages, the data collector is receiving and storing the system messages (318). The process of outputting, receiving, and storing continues until a fault of the computing device occurs (320) at time $t_1$ (322). As shown in FIG. 4, the data collector may continue to receive and store the last messages sent from the computing device.

When the fault is detected, a support technician may be contacted to recover the computing device. In one or more embodiments of the invention, the support technician carries a field receiver to the site of the computing device. Accordingly, the support technician starts the field receiver (324) at time $t_2$ (326). Further, the support technician may depress the synchronization button on the data collector at time $t_3$ (328).

The data collector interprets the selection of the synchronization button as having received a transmission request (330). Thus, the data collector initiates communication with and sends data to the field receiver (332). The field receiver receives the data (334). At time $t_4$ (336), the field receiver may be used to diagnose the cause of the fault of the computing device (338). After reviewing the cause of the fault, the support technician recovers the computing device (340) at time $t_5$ (342).

As shown by way of example above, because the system controller is factory preconfigured to send system messages and the data collector auto-starts, embodiments of the invention ease the ability to diagnose a fault by storing for a complete record of the system messages. Moreover, because the data collector uses a wireless port, special wires or cables are not required to obtain the system messages. Specifically, retrieval of the data from the data collector can be performed with a universal device (e.g., the field receiver). Accordingly, embodiments of the invention provide for a faster time to recovery of the computing device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for monitoring a computing device, comprising:
    passively receiving, by a data collector, a plurality of system messages from a hardware system controller,
    wherein the data collector is physically wired to a hardware serial port of the hardware system controller,
    wherein the hardware system controller is factory preconfigured to automatically send the plurality of system messages via the serial port when the data collector is connected to the serial port,
    wherein the computing device comprises the hardware system controller to monitor and control hardware on the computing device, and
    wherein the data collector is independent of the computing device and comprises a storage module, a hardware processor, a power unit, a wireless port, and a physical synchronization button;
    storing data from the plurality of system messages in the storage module on the data collector;
    receiving, via the physical synchronization button, by hardware processing unit on the data collector, a data transmit request; and
    wirelessly transmitting, by the data collector, the data to a field receiver via the wireless port on the data collector.

2. The method of claim 1, further comprising:
    encrypting, by the data collector, the data prior to storing the data.

3. The method of claim 1, further comprising:
    auto-starting, by the data collector, when the computing device starts, wherein the data collector is able to receive the plurality of system message immediately after auto-starting.

4. The method of claim 1, wherein the data is used from the field receiver to diagnose a fault of the computing device.

5. The method of claim 1, wherein the computing device is a server system comprising a physical frame, and wherein the data collector is in the physical frame.

6. The method of claim 1, wherein the data collector is a personal digital assistant comprising pocket virtual terminal software.

7. The method of claim 1, wherein the data transmit request is received by a support technician pressing the physical synchronization button.

8. An apparatus for monitoring a computing device, comprising:
    a power unit;
    a storage module for storing data from a plurality of system messages;
    a hardware processor for:
        receiving the plurality of system messages from a hardware system controller, wherein the computing device comprises the hardware system controller; and
        storing data from the plurality of system messages in the storage module;
    a physical synchronization button for:
        receiving a data transmit request; and
        initiate transmit to a receiving device,
        wherein the synchronization button is a dedicated button; and
    a wireless port for:
        wirelessly transmitting, based on the data transmit request, the plurality of system messages to the receiving device,
    wherein the apparatus is physically wired to a hardware serial port of the hardware system controller, wherein the hardware system controller is factory preconfigured to automatically send the plurality of system messages via the serial port when the data collector is connected to the serial port, wherein the computing device comprises the hardware system controller to monitor and control hardware on the computing device, wherein the apparatus passively receives the system messages, and wherein the apparatus is independent of the computing device.

9. The apparatus of claim 8, wherein the wireless port is an infrared port.

10. The apparatus of claim 8, wherein the apparatus is configured to automatically start.

11. The apparatus of claim 8, wherein the processing unit is configured to encrypt the plurality of system messages.

12. The apparatus of claim 8, wherein the computing device is a server system comprising a physical frame, and wherein the data collector is in the physical frame of the server system.

13. The apparatus of claim 8, wherein the storage module is an external card.

14. The apparatus of claim 8, wherein the data collector is a personal digital assistant comprising pocket virtual terminal software.

15. A method for diagnosing a fault of a computing device comprising:

selecting a physical synchronization button on a data collector;

receiving, by a field device, data from the data collector based on the selection, wherein the data is received wirelessly via a wireless port located on the data collector, wherein the data collector is physically wired to a hardware serial port of a hardware system controller, wherein the hardware system controller is factory preconfigured to automatically send a plurality of system messages via the serial port when the data collector is connected to the serial port, wherein the computing device comprises the hardware system controller to monitor and control hardware on the computing device, wherein the data collector is independent of the computing device and comprises a storage module, a hardware processor, a power unit, the wireless port, and the physical synchronization button, and wherein the data collector passively receives system messages from the computing device and stores data from the system messages in the storage module; and analyzing the data to identify the fault in the computing device.

16. The method of claim 15, wherein the field device is used by a service technician.

* * * * *